Nov. 18, 1952 R. G. THOMPSON 2,618,702

VARIABLE UNDERLAP DRUM FACSIMILE TRANSMITTING APPARATUS

Filed June 23, 1950 3 Sheets-Sheet 1

RUSSELL G. THOMPSON
INVENTOR
BY Daniel I. Mayne
Lella N. Carter
ATTORNEYS

Nov. 18, 1952 R. G. THOMPSON 2,618,702

VARIABLE UNDERLAP DRUM FACSIMILE TRANSMITTING APPARATUS

Filed June 23, 1950 3 Sheets-Sheet 2

RUSSELL G. THOMPSON
INVENTOR

Daniel J. Mayne
BY Rolla N. Carter
ATTORNEYS

VARIABLE UNDERLAP DRUM FACSIMILE TRANSMITTING APPARATUS

Filed June 23, 1950 3 Sheets-Sheet 3

RUSSELL G. THOMPSON
INVENTOR

Daniel J. Mayne
BY Kelly N. Carter
ATTORNEYS

Patented Nov. 18, 1952 2,618,702

UNITED STATES PATENT OFFICE 2,618,702

VARIABLE UNDERLAP DRUM FACSIMILE TRANSMITTING APPARATUS

Russell G. Thompson, Rochester, N. Y., assignor to Eastman Kodak Company, Rochester, N. Y., a corporation of New Jersey Application June 23, 1950, Serial No. 169,992

5 Claims. (Cl. 178—7.1)

This invention relates to facsimile apparatus and more particularly to facsimile transmitting apparatus adapted to scan picture sheets of different sizes.

In facsimile systems, the picture to be transmitted is generally wrapped around the surface of a drum which is rotated past a scanning beam of light. A suitably mounted photocell receives light reflected from the picture and converts it into corresponding electric currents which are employed to control a receiver apparatus. The clamping and other means employed for holding the picture on the drum pass the scanning beam once each revolution of the drum and, unless prevented from doing so, the resulting modulation of the light reflected to the photocell will cause undesirable markings along both margins of the recording medium.

Prior devices usually required the use of picture sheets of a size which would leave a predetermined underlap occupied by the clamping bar. A cam rotating with the drum was arranged in a position such that it would function to disable the recorder during the time this underlap was being scanned. Incidentally, this underlap period has generally been utilized for the transmission of a synchronizing signal.

The present invention contemplates a transmission drum provided with sheet-holding means adapted to accommodate sheets differing, within limits, in width. This results in different underlap periods during which the recorder should print "white" i. e., not try to reproduce the underlap. The fact that the sheets may also differ in length is of no consequence to the present invention.

An object of the invention is to provide a facsimile transmitter which will accommodate pictures of different sizes and which will not transmit signals corresponding to the scanning values of the underlap.

Another object of the invention is the provision of means adjustable with the manipulation of the sheet securing means for transmitting "white" during the underlap period as determined by the width of the sheet secured on the transmitting drum.

Another object of the invention is the provision of a commutator rotatable with a facsimile drum for completing a circuit during the time the underlap is passing the scanning light and adjustable with a bail which holds one edge of a picture sheet on the drum.

Other objects and advantages of the invention will be apparent from the following detailed description when read in connection with the accompanying drawings in which.

In accordance with the preferred embodiment of the invention, two relatively movable 180° commutator segments are carried by the shaft of the transmitter drum. One of these segments is fixed to the shaft with its trailing edge in a definite position with respect to the trailing edge of the clamp bar which holds one edge of the sheet on the drum. The other segment is rotatable on the shaft and carried by a paper wrapping roller or bail with its leading edge fixed in a definite position with respect to the leading edge of the bail. Thus the angular overlap of the commutator segments corresponds to the angle subtended by the underlap of the sheet on the drum and these segments are utilized to complete a circuit so that "white" will be recorded while the underlap is passing the scanning beam.

Figures 1, 2, 3:
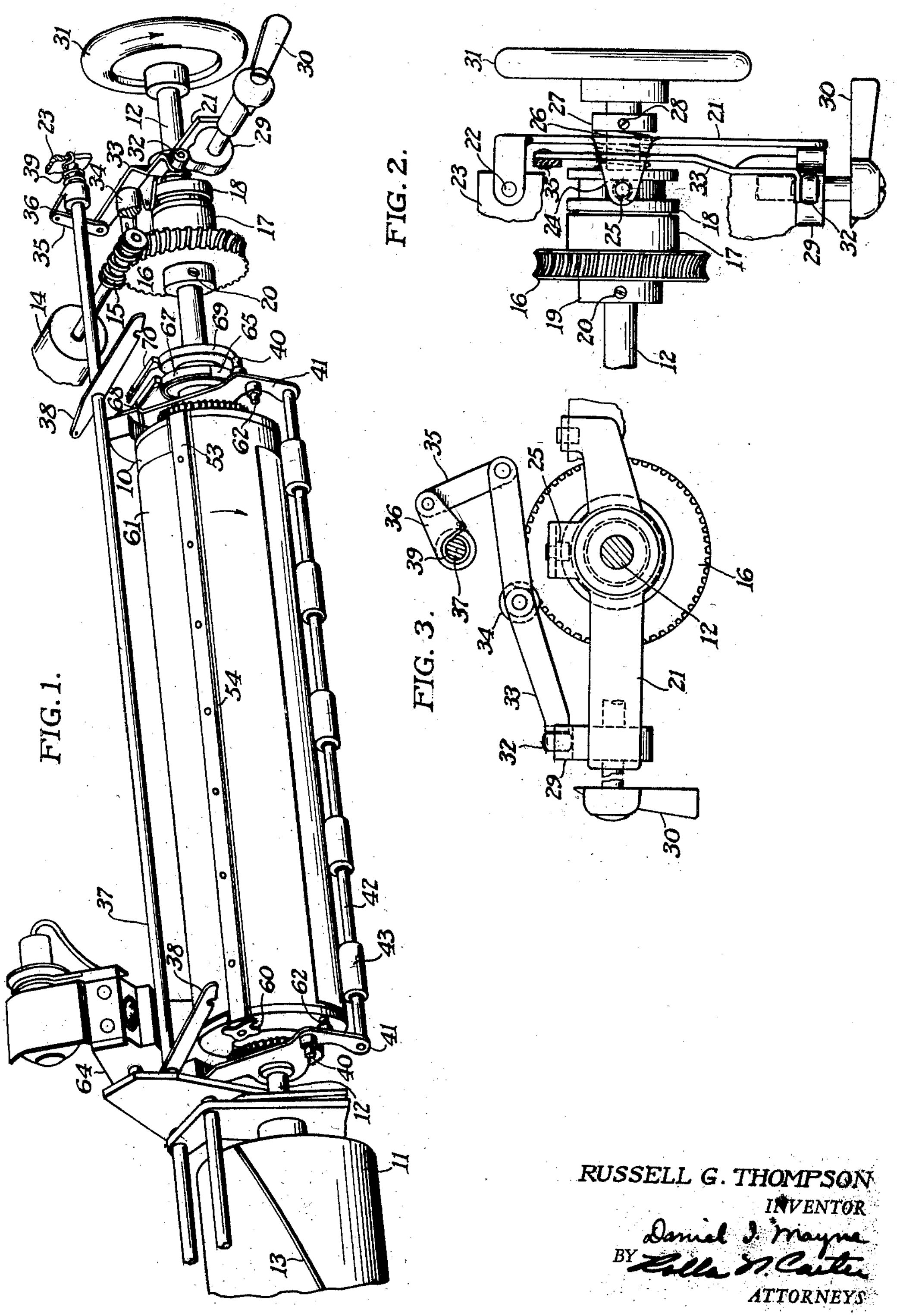
Fig. 1 is a partial view in perspective of a facsimile apparatus embodying the preferred form of the invention.
Fig. 2 is a plan view of the clutch actuating mechanism shown in Fig. 1.
Fig. 3 is a sectional end view of certain parts of the actuating means for the clutch and bail latch shown in Fig. 1.

More particularly, there are shown in Fig. 1 parts of a facsimile apparatus including a transmitting drum 10 and a recording drum 11 having a common shaft 12. The recording drum 11 is shown provided with a helical ridge 13 scanning element but any other well known recorder may be employed since the recorder per se forms no part of the present invention. The shaft 12 is adapted to be driven by a suitable motor 14 through a worm 15, a worm gear 16 and two clutch members 17 and 18. The member 17 is carried by the worm gear 16 and contains a clutch socket while the member 18 which has a clutch cone is keyed to but free to move longitudinally of the shaft 12. The clutch socket member 17 and the worm gear 16 are freely rotatable on the shaft 12 but are restrained from longitudinal movement by any suitable means such as a collar 19 held in place by a set screw 20.

A clutch lever 21 pivoted at 22 to the frame 23 of the apparatus has an ear 24 provided with a pin 25 extending into a circumferential groove formed in the clutch cone member 18. A compressed spring 26 between the clutch cone member 18 and a collar 27 secured to the shaft 12 by a set screw 28 serves to bias the clutch cone member 18 to clutch engaging position. A cam 29, when rotated clockwise by a handle 30, 90 degrees from its position as shown in Fig. 1 will move the clutch lever 21 to the right and thereby disengage the clutch members 17 and 18 to stop rotation of the shaft 12 while the worm gear 16 continues to be rotated by the motor 14. Any other suitable clutch mechanism may of course be employed. With the clutch members disengaged the shaft 12 may be readily rotated by a hand wheel 31 for securing to the drum 10 the picture to be reproduced.

With the handle 30 in the position shown in Figs. 1 and 2 the clutch lever 21 is in clutch engaging position and the riser on the cam 29 elevates a follower 32 carried on one end of a lever 33 fulcrumed near its middle on a boss 34 provided on a portion of the frame 23. The other end of the cam follower lever 33 is connected through a link 35 to a crank arm 36 to control the angular position of a rod 37 extending parallel to the drum 10 and carrying two latch arms 38. The follower 32 is urged against the cam by a torsion spring 39 encircling the end of the rod 37 and with one end secured to the crank arm 36 and with the other end anchored to the frame 23. Thus, when the handle 30 is rotated to disengage the clutch members 17 and 18 the surface of the cam 29 permits the spring 39 to rotate the rod 37 to bring the latch members 38 into position to have their notches engaged by pins 40 extending longitudinally of bail plates 41. The bail plates 41 support a paper bail 42 which may be provided with a number of spaced rubber rollers 43 for wrapping a document onto the drum 10 and for holding one edge of the document during a scanning operation.

Figure 4:
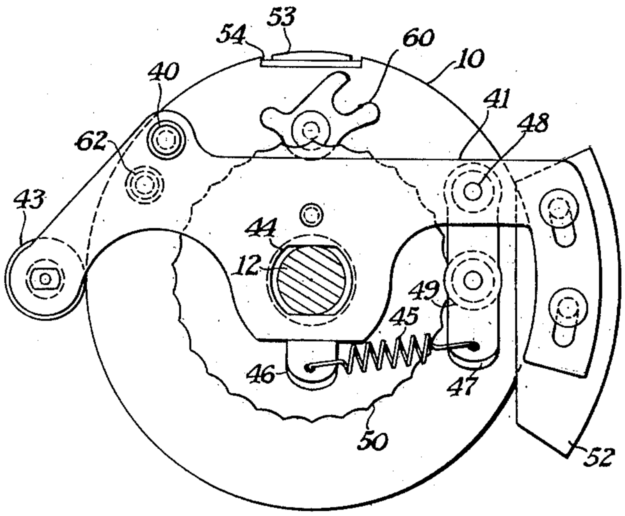
Figs. 4 and 5 are end and plan views, respectively, of the mounting means for the paper bail shown in Fig. 1.
Figure 5:
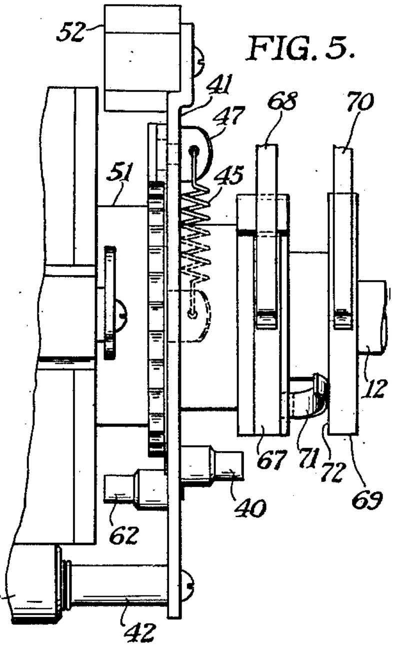

As best shown in Figs. 4 and 5, the bail plates 41 have slotted openings 44 which bear against the shaft 12 in one dimension but are larger than the shaft 12 in the dimension extending through the paper bail 42 so that documents differing in thickness may pass between the bail 42 and the drum 10. A spring 45 under tension between a bent-out ear 46 on the bail plate 41 and the bent-out end of an arm 47 having its other end pivotally secured at 48 to the bail plate 41 performs the dual functions of biasing the paper bail 42 against the surface of the drum 10 and of pressing a roller 49 carried by the arm 47 into engagement with a detent-wheel 50 secured to a reduced end 51 of the drum 10. By reason of the spring pressed roller 49 engaging the detent wheel 50 the bail plate 41 can easily be rotated with respect to the drum 10 but will, in the absence of an outside force, rotate with the drum 10. A counterweight 52 is attached to the bail plate 41 for balancing purposes.

Figure 6:
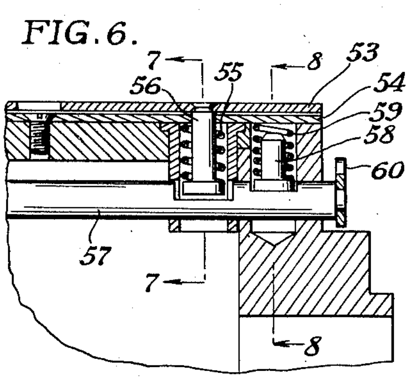
Figs. 6, 7 and 8 are sectional views of details of the clamping bar shown in Fig. 1.
Figures 7, 8:
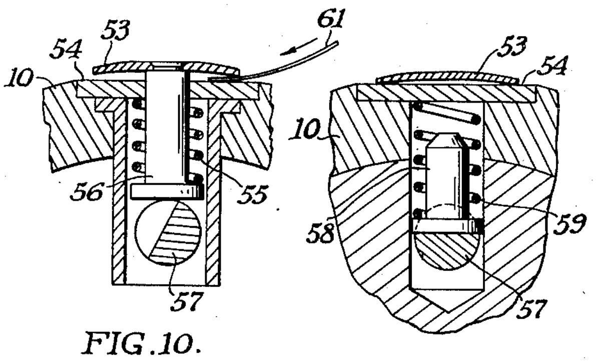

As shown in Figs. 6 and 7 a clamping bar 53 extending longitudinally of the drum 10 for securing one edge of a document or picture sheet to be transmitted is biased to closed position against a plate 54 by means of a spring 55 under compression between the under surface of the plate 54 and the head of a stud 56 extending through the plate 54 and secured to the clamping bar 53 as by riveting. It will be understood that a plurality of similarly arranged biasing springs 55 are employed along the length of the clamping bar 53 as illustrated in Fig. 1. A cam shaft 57 common to all the studs 56 has cam surfaces formed by grinding flats in the shaft 57 to a depth such that there is clearance between the cam surface and the head of the stud 56 at its lowest limit of travel. For the reason next to be explained, this clearance permits a limited rotation of the cam shaft 57 without moving the clamping bar 53.

Referring now to Figs. 6 and 8, it will be noted that the cam shaft 57 has an additional flat against which a floating follower 58 is pressed by a spring 59 under compression between the plate 54 and the follower 58. This cam flat is milled to a depth which is less than the radius of the shaft 57 so that the shaft 57 is stabilized in the position shown in Fig. 8, i. e., the shaft 57 is unstable in any other angular position in which the face of the follower 58 is not tangent to the circular portion of the shaft 57. This stabilized position of the shaft 57 is such that a bifurcated crank 60 secured to the end of the shaft 57 is in the position shown in Fig. 4. The above-mentioned permissible limited rotation of the cam shaft 57 allows the pins 62 to temporarily depress the cranks 60 as the pins 62 move past.

In order to insert one end of a picture sheet 61 under the clamping bar 53, the handle 30 is turned to disengage the clutch members 17 and 18 and to allow the spring 39 to rotate the latch arms 38 into the path of the pins 40 (see Fig. 1). The hand wheel 31 is rotated in the direction of the arrow, which is the direction of the scanning rotation, until the arms 38 engage and latch the pins 40 on the bail plates 41. The hand wheel 31 is now rotated in the opposite direction to rotate the drum 10 relatively to the stationary bail 42 until the bifurcated ends of the cranks 60 receive pins 62 carried by the bail plates 41 and the cranks 60 rotated, about 90 degrees, until lugs 63 on the cranks 60 engage the reduced end portion 51 of the drum 10. This rotation of the cranks 60 turns the cam shaft 57 to raise the clamp bar 53 to the position shown in Fig. 7 thereby permitting the edge of the sheet 61 to be inserted thereunder. Rotation of the handwheel 31 in the direction of scanning, releases the cranks 60 and the bar 53 clamps the edge of the sheet 61. Continued turning of the handwheel 31 rotates the drum 10 and the sheet 61 under the paper bail 42 which wraps the sheet 61 smoothly on the drum 10. After the drum 10 has been turned so that the trailing edge of the sheet 61 to be scanned is adjacent the bail 42, the handle 30 is returned to the clutch engaging position shown in Fig. 1 which releases the latches 38 so that the entire assembly of drum, clamp, sheet and paper bail may rotate for a scanning operation.

A scanning unit 64 may be of any known structure for projecting a beam of light onto the sheet 61 and for deriving electric signals corresponding to the light reflecting properties of successive elemental areas of the picture on the sheet 61. The drum 10 is rotated at a constant rate while the scanning unit 64 moves along the drum parallel to its axis in a well known manner.

Figure 9:
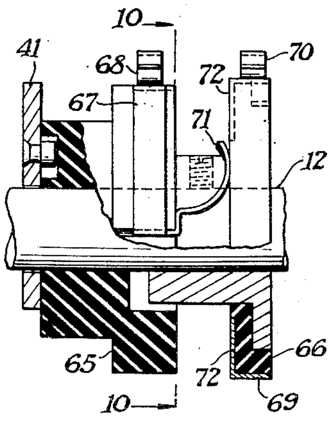
Figs. 9 and 10 are front and end views, partly in section, showing the construction of the adjustable commutator on the apparatus shown in Fig. 1.
Figure 10:
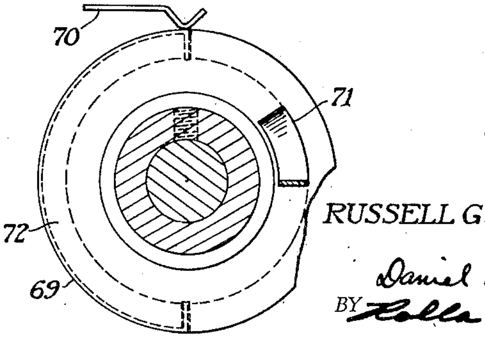

The underlap which is that portion of the drum 10 between the paper bail 42 and the trailing edge of the clamp bar 53 is different for picture sheets of different sizes and in order to assure in each case that this underlap is not reproduced, a commutator whose adjustment is determined by the position of the paper bail 42 functions to cause a "white" signal (which may be no signal) to be transmitted whenever the underlap is being scanned. As shown in Figs. 1, 9 and 10 this adjustable commutator is in the form of two slip rings 65 and 66 of insulating material, each provided on its periphery with a 180 degree conducting strip. The slip ring 65 is pinned to the bail plate 41 and the ring 66 is fixed to the shaft 12. The leading edge of the conducting strip 67 on the ring 65 is fixed in a definite position with respect to the leading edge of the paper bail 42 so that the strip 67 makes contact with its brush 68 just prior to the instant the leading edge of the bail 42 enters the scanning beam. The conducting strip 69 is positioned on the ring 66 so that its trailing edge leaves its associated brush 70 just after the trailing edge of the clamp bar 53 has passed the scanning beam.

It is now apparent that the mounting of the sheet 61 on the drum 10 automatically adjusts the slip rings 65 and 66 so that the angular overlap of their conducting strips 67 and 69 corresponds to the angle subtended by the underlap on the drum 10. The conducting strips are electrically connected as by a spring contact member 71 secured to the ring 65 in contact with the strip 67 and extending into sliding contact with an annular plate 72 of conducting material secured to the side of the ring 66 and in electrical contact with the conducting strip 69.

The operation of the commutator will now be described in connection with Fig. 11 which shows schematically the relation between the overlap of the conducting strips 67 and 69, the underlap of the sheet 61 on the drum 10, the brushes 68 and 70, and the scanning unit 64. When intense light is reflected by the sheet 61 onto a photocell 73 in the scanning unit 64, the cell 73 has maximum conduction and the signal passed by an amplifier 74 to the electromagnetic driver 75 for a printer bar 76 is such as to hold the bar 76 up, i. e., it prints "white." The printer bar 76 and its driver 75 may be constructed as described in my copending application Serial No. 12,077, filed February 28, 1948.

Figure 11:
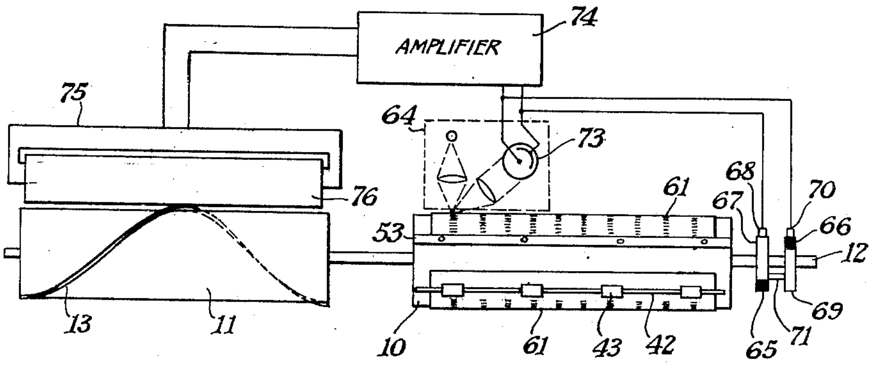
Fig. 11 is a front view schematically showing the operating parts of a complete facsimile apparatus.

During scanning the shaft 12 is rotated so that the front of the drum 10 moves downward as viewed in Fig. 11. As here shown, the brushes 68 and 70, the scanning unit 64, and the shaft 12 are in a common plane so that the leading edge of the commutator strip 67 is in line with the leading edge of the paper bail rollers 43 and the trailing edge of the commutator strip 69 is in line with the trailing edge of the clamp bar 53. Thus, from the time the leading edge of the rollers 43 enters the scanning beam until the trailing edge of the clamp bar 53 leaves the scanning beam, the two brushes 68 and 70 are both in contact with their respective commutator strips 67 and 69 which render the input circuit to the amplifier 74 conductive and, hence, the bar 76 does not print regardless of whether or not light is reflected to the photocell 73.

Figure 12:
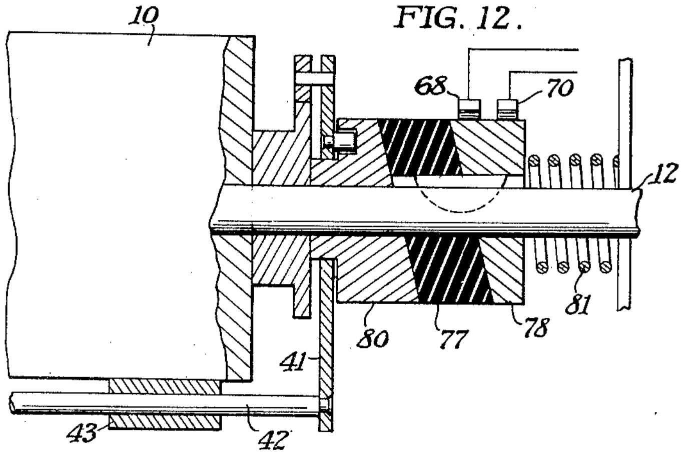
Fig. 12 shows schematically an alternative embodiment of the invention.

An alternative arrangement is shown in Fig. 12 wherein the commutator is axially eccentric and is shifted along its axis in accordance with the position of the paper holding bail 42 on the drum 10. More specifically, the commutator comprises a disc 77 of insulating material and a disc 78 of conducting material mounted on the shaft 12 for axial movement but restrained from rotational movement by a key 79. The two discs 77 and 78 are joined together in a plane inclined to the axis of the shaft 12 whereby the angle of rotation through which both the brushes 68 and 70 make contact with the conducting disc 78 depends upon the axial position of the commutator. By securing to the bail plate 41 a face cam 80 which is rotatable with the plate 41 on the shaft 12 the axial position of the commutator will depend upon the position of the bail 42 with the result that the angle through which the two brushes 68 and 70 are shorted by the conducting disc 78 will correspond to the angle subtended by the underlap of the picture sheet on the drum 10. A spring 81 is provided to urge the commutator against the face cam 80. As before, this arrangement can be employed to cause a "white" signal to be transmitted throughout the interval the underlap is being scanned.

While for the purpose of disclosing the invention only two specific embodiments have been described in detail, it will be evident to those skilled in the art that many other obvious embodiments may be devised without departing from the invention, the scope of which is pointed out in the appended claims.

What I claim as new and desire to secure by Letters Patent of the United States is:

1. In a facsimile transmission apparatus, a rotatable drum for supporting a picture sheet, means for securing picture sheets of varying width to the surface of the drum comprising means mounted on the drum for gripping the leading edge of the picture sheet and a paper bail for pressing the trailing edge of the picture sheet against the drum whereby the underlap between the leading edge of the paper bail and the trailing edge of the gripping means varies in width according to the width of the picture sheet, a scanning system for analyzing the picture sheet, and a commutator rotatable with the drum and adjustable by the movement of the paper bail to the trailing edge of the picture sheet for completing a circuit only during the times the underlap is being scanned.

2. The apparatus claimed in claim 1 wherein the commutator comprises two semi-circular conducting segments electrically connected and spaced axially on a rotatable shaft to which the drum is secured, one of said segments being fixed to the shaft and having an associated sliding contact so positioned that upon rotation of the drum the trailing end of said one segment leaves its contact at the time the trailing edge of the sheet gripping means passes the scanning system, the other of said segments being rotatably mounted on the shaft for movement with the paper bail and having an associated sliding contact so positioned that upon rotation of the drum the leading end of said other segment comes under its contact at the time the leading edge of the paper bail enters the scanning system.

3. The apparatus claimed in claim 1 wherein the commutator comprises an axially eccentric ring of conducting material having two axially spaced associated sliding contacts and the movement of the paper bail produces relative movement parallel to the axis of the drum between said ring and said sliding contacts.

4. In facsimile transmission apparatus, a rotatable picture sheet carrying drum, a clamp bar extending longitudinally of the drum for gripping one edge of a picture sheet, a paper bail rotatable relatively to the drum for wrapping the picture sheet around the drum, spring means for urging the paper bail toward the surface of the drum and for releasably holding the paper bail in fixed position on the drum whereby the other edge of the picture sheet is secured in position for a scanning operation, scanning means for deriving signals corresponding to the light values of the picture sheet, and means adjustable by the wrapping movement of the paper bail to said other edge of the picture sheet for providing a signal corresponding to "white" whenever the underlap portion of the drum is being scanned.

5. In facsimile transmission apparatus, a rotatable sheet supporting drum, an output circuit, a scanning system for furnishing signals to the output circuit, means carried by and extending longitudinally along the drum for holding one edge of a sheet, means extending longitudinally along and movable circumferentially of the drum to the opposite edge of the sheet for holding said opposite edge of the sheet whereby the angular separation of the two holding means is a function of the width of the sheet, and means controlled by the movement of the circumferentially movable means for furnishing a predetermined signal to the output circuit while the underlap defined by the two holding means is being scanned.

RUSSELL G. THOMPSON.

REFERENCES CITED

The following references are of record in the file of this patent:

UNITED STATES PATENTS

| Number | Name | Date |
|---|---|---|
| 1,719,916 | Watson | July 9, 1929 |
| 1,747,839 | Ogle | Feb. 18, 1930 |
| 2,136,789 | Finch | Nov. 15, 1938 |
| 2,255,868 | Wise | Sept. 16, 1941 |
| 2,263,332 | Finch | Nov. 18, 1941 |
| 2,447,473 | Finch | Aug. 17, 1948 |

FOREIGN PATENTS

| Number | Country | Date |
|---|---|---|
| 199,349 | Great Britain | Mar. 14, 1924 |